Mar. 27, 1923.
E. I. DODDS.
LOCK NUT.
FILED APR. 27, 1921.
1,450,065.
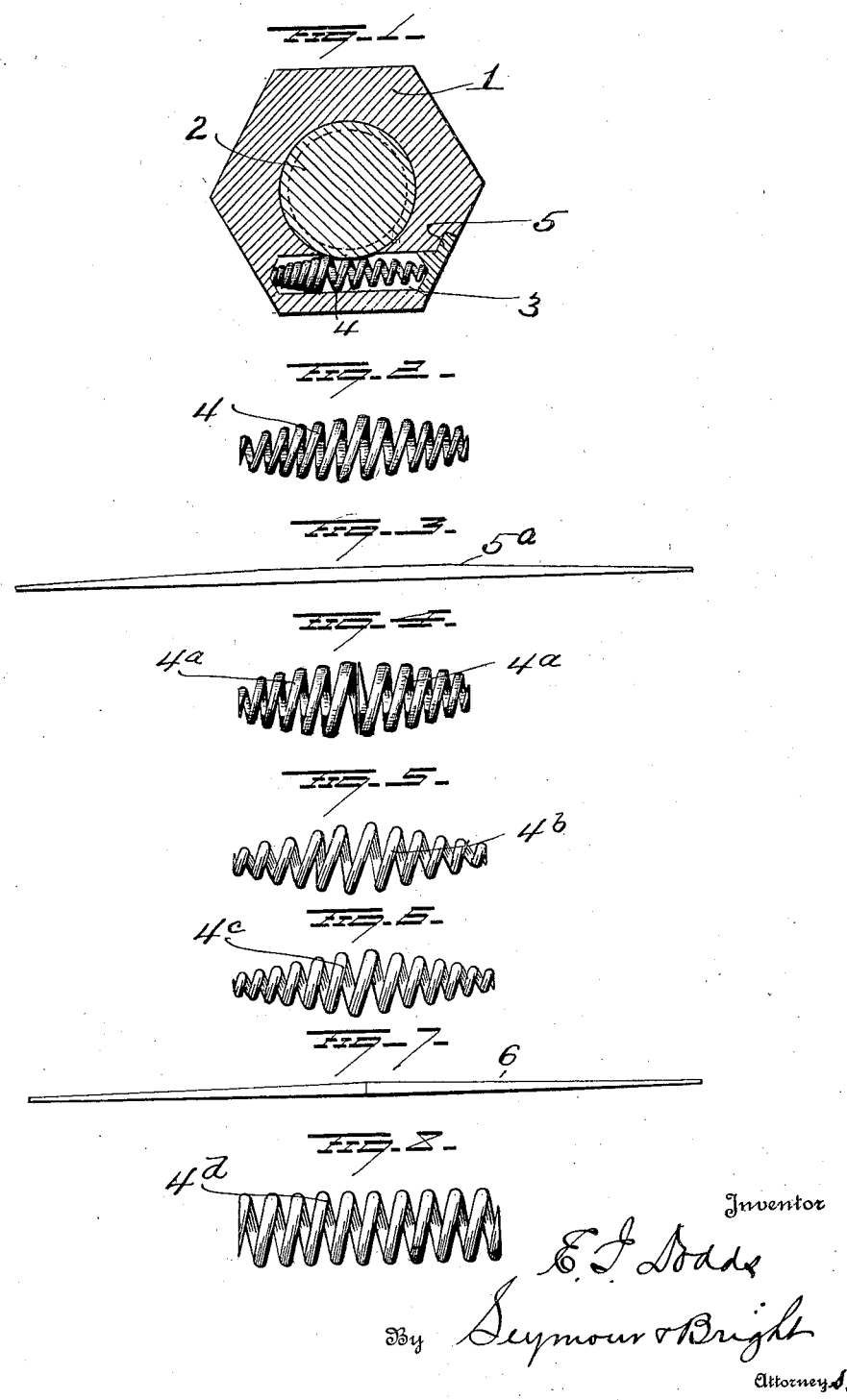

Patented Mar. 27, 1923.

1,450,065

UNITED STATES PATENT OFFICE.

ETHAN I. DODDS, OF CENTRAL VALLEY, NEW YORK, ASSIGNOR TO FLANNERY BOLT COMPANY, OF PITTSBURGH, PENNSYLVANIA.

LOCK NUT.

Application filed April 27, 1921. Serial No. 464,937.

*To all whom it may concern:*

Be it known that I, ETHAN I. DODDS, a citizen of the United States, and a resident of Central Valley, in the county of Orange and State of New York, have invented certain new and useful Improvements in Lock Nuts; and I do hereby declare the following to be a full, clear, and exact description of the invention, such as will enable others skilled in the art to which it appertains to make and use the same.

This invention relates to improvements in lock-nuts,—one object of the invention being to provide a lock-nut with spring means permanently enclosed therein, which spring means shall be so located within a chamber in the nut that it shall be so cooperable with a threaded bolt as to constitute locking means for the nut to prevent, under normal conditions, backward turning of the nut, but which shall operate when a vigorous backward turning force is applied to the nut, to so release the nut as to permit the latter to be unscrewed from the bolt.

With this and other objects in view, the invention consists in certain novel features of construction as hereinafter set forth and pointed out in the claims.

In the accompanying drawings, Figure 1 is a sectional view showing an application of my invention; Figure 2 is an enlarged view of the spring; Figure 3 is a view of the strip or wire from which the spring locking means may be made, and Figures 4, 5, 6, 7 and 8 are views illustrating modifications.

1 represents a nut and 2 a threaded bolt on which it may be screwed.

The nut 1 is provided with an elongated chamber or bore 3 which is so located that it will be approximately tangential to the bore of the nut and so that its intermediate portion shall intersect a thread or threads in the nut and cut through the same. A spring locking member 4 is located in the chamber 3 and bears at one end against one end of said chamber. The other end of said chamber is sealed by a closure 5 which may constitute an abutment for the opposite end of the spring locking member, said spring locking member being kept normally under a degree of compression.

In the embodiment of the invention shown in Figures 1, 2 and 3, the locking member consists of a coiled spring which tapers from its central portion toward both of its ends, the central portion of said spring having such diameter that it will, normally, be disposed in that portion of the chamber 3 which intersects one or more of the threads in the nut and engage the threaded bolt. The spring locking member 4 may be made from a strip of spring steel 5ª tapering from its central portion toward both ends and this strip may be so formed that its outer face only may be inclined from the central portion of the strip toward both ends as shown in Figure 3,—the strip 5ª thus being so shaped that it may have a more or less angular cross section with its outer or upper face slightly rounded. When the strip is coiled on a suitable cylindrical mandrel, a coil will be formed having a bore of uniform diameter from end to end, but the external diameter will be greatest at the central portion of the spring and diminishing toward its ends.

When a spring locking member such as above described shall have been enclosed within the chamber 3 of the nut and the latter screwed onto a threaded bolt, the intermediate portion of the spring will be engaged by threads of the bolt and said spring will be thus forced laterally in a direction away from that portion of the chamber 3 which intersects a thread or threads in the nut,—thus causing approximately one-half of the spring to be compressed and the other half to be permitted to expand, as shown in Figure 1. The central portion of the spring will now have become so disposed in the chamber, between a thread on the bolt and the wall of the chamber as to prevent backward turning of the nut, under normal conditions. Should it be desired, however, to remove the nut, this may be accomplished by applying to the nut a vigorous backward turning force which will cause the locking portion of the spring to be slightly compressed or collapsed or to be forced past the thread on the bolt with which it engaged and become disposed at the opposite side of the central portion of the chamber 3, and then the nut may be unscrewed.

Instead of making the spring locking member in a single piece, it may be made in two parts $4^a$, $4^a$, having their inner ends normally abutting against each other as shown in Figure 4.

Instead of so forming the tapering spring locking member that it shall have a bore of uniform diameter from end to end, said tapering spring may be made tapering both internally and externally from its central toward its end portions as shown at $4^b$ Figure 5 and this spring may be made of round wire, having a uniform diameter from end to end, or a round wire such as shown at 6, Figure 7, made tapering from its central to its respective end portions may be employed, and a spring locking member $4^c$ tapering both internally and externally from its central to its end portions may be formed with such wire, as shown in Figure 6.

Instead of making the spring locking member tapering from its central to its end portions, said member may consist of a cylindrical coiled spring $4^d$ as shown in Figure 8.

Other changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. A lock nut having a chamber intersecting its threaded interior and a coiled spring constituting locking means disposed in said chamber and directly cooperable with a threaded portion of a bolt on which the nut is screwed to resist backward turning of the nut.

2. A lock-nut having a chamber intersecting its threaded interior, and tapering spring means in said chamber, a portion of said tapering spring means being normally disposed in that portion of the chamber which intersects the threaded interior of the nut, said tapering spring means constituting locking means directly cooperable with a threaded portion of a bolt on which the nut is screwed to resist backward turning of the nut.

3. A lock-nut having a chamber intersecting its threaded interior and a coiled spring device in said chamber having an intermediate portion normally disposed in that part of said chamber which intersects the threaded interior of the nut.

4. A lock-nut having a chamber intersecting its threaded interior and a locking member in said chamber consisting of a coiled spring tapering from its central toward its respective end portions, a portion of said spring having the maximum diameter being normally disposed in the portion of said chamber which intersects the threaded interior of the nut.

5. A lock-nut having a chamber intersecting its threaded interior, and a spring locking member in said chamber, said member consisting of a coiled spring tapering from its central toward its end portions, and the material of said spring diminishing in diameter from its central toward its end portions, a portion of said spring having the greatest diameter being normally disposed in the portion of said chamber which intersects the threaded interior of the nut.

6. A lock-nut having a chamber which intersects its threaded exterior, and a spring locking member contained in said chamber and consisting of a coiled spring tapering exteriorly from its central toward its end portions, said coiled spring having a cylindrical bore, and a portion of the spring having the maximum diameter being disposed in that portion of the chamber which intersects the threaded interior of the nut.

In testimony whereof, I have signed this specification in the presence of the subscribing witness.

ETHAN I. DODDS.

Witness:
EDWIN S. RYCE.